United States Patent
Lefrancois des Courtis et al.

(10) Patent No.: US 9,998,417 B2
(45) Date of Patent: *Jun. 12, 2018

(54) METHOD AND SYSTEM AND APPARATUS FOR MASS NOTIFICATION AND INSTRUCTIONS TO COMPUTING DEVICES

(71) Applicant: Mitel Networks Corporation, Ottawa (CA)

(72) Inventors: Eric Alexandre Lefrancois des Courtis, Ottawa (CA); Ying Du, Ottawa (CA); Dan Le, Kanata (CA); Yuanyuan Liu, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/589,148

(22) Filed: Jan. 5, 2015

(65) Prior Publication Data

US 2015/0113316 A1    Apr. 23, 2015

Related U.S. Application Data

(63) Continuation of application No. 12/887,135, filed on Sep. 21, 2010, now Pat. No. 8,943,146.

(51) Int. Cl.
| | |
|---|---|
| *G06F 15/16* | (2006.01) |
| *H04L 12/58* | (2006.01) |
| *H04L 29/08* | (2006.01) |
| *G06Q 30/02* | (2012.01) |
| *H04L 12/18* | (2006.01) |
| *G06F 11/20* | (2006.01) |

(52) U.S. Cl.
CPC .......... *H04L 51/24* (2013.01); *G06F 11/2007* (2013.01); *G06Q 30/02* (2013.01); *H04L 12/1859* (2013.01); *H04L 12/1895* (2013.01); *H04L 67/26* (2013.01); *G06F 2201/805* (2013.01)

(58) Field of Classification Search
CPC ..... H04L 67/26; H04L 12/58; H04L 12/1859; H04L 51/24; H04L 12/1895
See application file for complete search history.

(56) References Cited

U.S. PATENT DOCUMENTS

| | | | |
|---|---|---|---|
| 5,875,302 A * | 2/1999 | Obhan | H04L 51/24 709/225 |
| 7,034,691 B1 | 4/2006 | Rapaport | |
| 7,093,251 B2 | 8/2006 | Tsun | |
| 8,032,397 B2 | 10/2011 | Lawless | |
| 2002/0161833 A1 | 10/2002 | Niven | |

(Continued)

FOREIGN PATENT DOCUMENTS

WO    WO 2009/070882    6/2009

OTHER PUBLICATIONS

International Searching Authority, PCT International Search Report and Written Opinion for PCT/CA2010/001442, dated Jun. 13, 2011, 9 pages.

*Primary Examiner* — Chirag R Patel

(57) ABSTRACT

Systems, methods, and devices for simultaneously distributing mass notifications to multiple users. A mass notification system receives input data and, based on this input data, creates notifications for mass distribution. The notifications are then transmitted to computing devices used by the users who are to be notified.

20 Claims, 11 Drawing Sheets

(56) References Cited

U.S. PATENT DOCUMENTS

| | | | |
|---|---|---|---|
| 2003/0027552 A1* | 2/2003 | Kouznetsov | H04L 63/20 455/410 |
| 2003/0069002 A1 | 4/2003 | Hunter | |
| 2003/0158933 A1 | 8/2003 | Smith | |
| 2004/0098218 A1* | 5/2004 | Ito | F16K 37/0091 702/138 |
| 2004/0180674 A1* | 9/2004 | Blomqvist | H04M 3/42348 455/456.5 |
| 2004/0193617 A1 | 9/2004 | Adler | |
| 2005/0060381 A1* | 3/2005 | Huynh | H04L 29/06 709/206 |
| 2005/0085257 A1 | 4/2005 | Laird | |
| 2006/0109113 A1 | 5/2006 | Reyes | |
| 2006/0234672 A1 | 10/2006 | Adler | |
| 2006/0236083 A1 | 10/2006 | Fritsch | |
| 2006/0271675 A1 | 11/2006 | Wakazono | |
| 2006/0273893 A1 | 12/2006 | Warner | |
| 2008/0189721 A1 | 8/2008 | Buchanan | |
| 2008/0201748 A1* | 8/2008 | Hasek | H04N 7/17309 725/98 |
| 2008/0284587 A1 | 11/2008 | Saigh | |
| 2008/0293443 A1 | 11/2008 | Pettinato | |
| 2009/0055220 A1 | 2/2009 | Rapaport | |
| 2009/0276712 A1 | 11/2009 | Gregory | |
| 2009/0300690 A1 | 12/2009 | Xu | |
| 2009/0325538 A1 | 12/2009 | Senett | |
| 2010/0146057 A1 | 6/2010 | Abu-Hakima | |
| 2010/0199188 A1 | 8/2010 | Abu-Hakima | |
| 2010/0306061 A1 | 12/2010 | Wagner | |
| 2011/0029598 A1* | 2/2011 | Arnold | H04L 67/26 709/203 |

\* cited by examiner

Figure 6   Screenshot of Admin Window

Notification Window
600

610

Enter your notification title

620

Point to the file you want to attach

615

Enter your notification message

650

Select the Devices from the list

625

☐ Requires Acknowledgement

...

Select Devices on the maps

627

[ ] (hh:mm)

630

○ Normal   ○ Severe   ○ Evacuation

Group Filter Criteria (e.g. IP range, hostname)

640

Enter the Date and Time (dd/mm/yyyy)   (hh:mm)

☐ Recurring Schedule

Figure 8            Notification Window

METHOD AND SYSTEM AND APPARATUS FOR MASS NOTIFICATION AND INSTRUCTIONS TO COMPUTING DEVICES

This application is a continuation of and claims priority to U.S. patent application Ser. No. 12/887,135, filed Sep. 21, 2010, now allowed, which is incorporated herein in its entirety.

FIELD OF THE INVENTION

The specification relates to a method, apparatus, and system for mass notification and instruction to computing devices.

BACKGROUND OF THE INVENTION

A notification system is a combination of software and hardware that provides a means of delivering messages to a set of recipients. For example, notification systems can send emails or text messages or make phone calls with automated messages. The complexity of the notification system is often dependent on the application. The use of notification systems range from simple publicity applications (e.g. sending notifications of a new product or a sale) to emergency applications (e.g. notifying individuals of a dangerous situation).

With the pervasive use and high availability of different types of computing devices (e.g. Personal Computer, laptop, terminal connected to a server, dumb terminal, tablet computer, PDA, Internet Protocol phone, smart phone), the notification system needs to be capable of reaching any type of computing devices at any time and adapting the presentation of the notification to the capability of the computing device for the notification to have the broadest reach.

Existing notification systems establish connectivity with the devices to be notified at the time of sending a notification. When used as an emergency application, there is a need to keep constant connectivity with all the computing devices that need to receive notifications and to ensure the computing devices are running the correct version of the notification client where applicable.

Notification systems are generally unidirectional, whereby the notification is broadcasted or dispatched to a set of devices and there is little to no capability to extract information from the recipient of the notification. As such, there is a need for bidirectional capability in a notification system, to extract information from the recipient of the notification and to manage the extracted information. For example, in an emergency notification application, it would be of value to request an acknowledgement that a user has received the notification and to maintain a record of which users have acknowledged the notification.

In some applications (e.g. an evacuation scenario), there is also a need for the notification system to take control of the computing devices receiving the notifications and to execute programs on these computing devices to remotely manage the computing devices (e.g. run virus checks or software inventory, shutdown or lock the computing devices).

SUMMARY OF INVENTION

The present invention provides systems, methods, and devices for simultaneously distributing mass notifications to multiple users. A mass notification system receives input data and, based on this input data, creates notifications for mass distribution. The notifications are then transmitted to computing devices used by the users who are to be notified.

In a first aspect, the present invention provides a computer server for sending notifications to a plurality of users, the server comprising:
an administrator manager module for receiving input data relating to said notifications
a scheduler for processing said input data to select which selected users from among said plurality of users are to receive said notification and for creating notification data to be sent to computing devices
a notification module for sending notification data to computing devices used by said selected users wherein
said server maintains a constant live link with at least one computing device
upon receipt of said notification data by said computing devices, each of said computing devices executes instructions for presenting indicia to a selected user;
at least one of said computing devices comprises:
a connectivity manager for receiving notification data from said server
a computing device client for determining contents of said notification data and, based on said contents, for executing instructions for presenting indicia to a user of said computing device.

BRIEF DESCRIPTION OF THE DRAWINGS

Embodiments are described with reference to the following figures, in which:

FIG. 6 is an exemplary notification creation window.

DETAILED DESCRIPTION OF THE INVENTION

Figure 1:
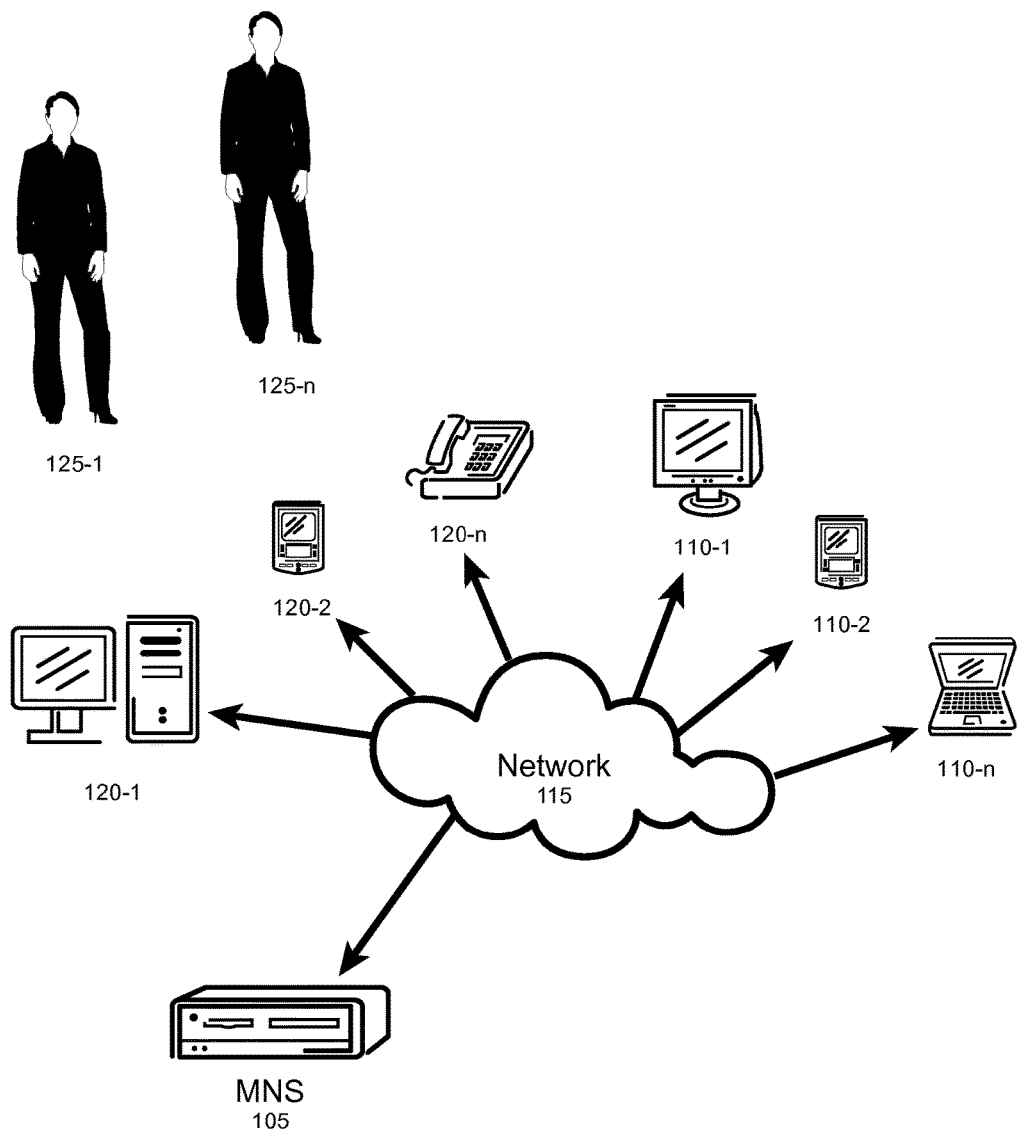
FIG. 1 is a schematic diagram of a mass notification system according to a non-limiting embodiment.

A mass notification system (MNS) is used to present notifications to the users of one or more computing devices. Once the computing devices receive notification data relating to the notification, the computing devices execute instructions that present notification-based text, audio, or multimedia indicia to the user, thereby alerting the user. The computing devices may also execute other instructions or launch other applications once the notification data has been received. As a first example, the MNS can be used to present emergency notifications (e.g. fire drills, fire alarms, building evacuations, dangerous individual) via the computing device interfaces (e.g. screen, audio). Notifications can be geocoded with relevant coordinates and group information such that only a select subset of computing devices receive notification data relevant to that subset of computing devices. The geo-coding can also be used so that the transmission of the notification data can be prioritized based on the location of computing devices. The reception of the notification data by the computing devices can also cause the execution of instructions that lock or shut down the computing devices. The MNS can also be used to perform the controlled shutdown of multiple systems for the purpose of conserving energy, such as, for example, the shutdown of all the computing devices in an office building after work hours, or the shutdown of all the computing devices in a library at night.

The MNS can also be used to poll a select group of users to gather specific information. For example, a notification can be sent out with multiple questions to a selected group of computing devices. A question can require, for example, a multiple-choice answer or a free-text answer to gather feedback or a yes/no answer. A combination of all question types is also possible.

The MNS can also be used to run specific programs on the computing devices, for example running a periodic virus check or remote locking a mobile phone.

The MNS can also be used to distribute customer trouble tickets of different severity to a selected group of people, for example to facilitate the processing of customer complaints in a restaurant, hotel, or other types of stores.

The MNS can also be used to distribute work orders to a select worker or group of workers. The worker or group of workers can be selected based on skills required to complete the work order, or other criteria.

Another possible use of the MNS is for the constant updating of a banner of information on part of a screen, for example news reports about a developing situation, stock information, and other regularly changing information that needs to be monitored.

The MNS can also be used for interactive compliance audits, such as conflict checking within a law firm. In this application the MNS can display the name of the potential new client and its competitors on the relevant screens and the lawyers have to acknowledge whether or not they have been involved with the competitors.

Another use of the MNS would be for staffing notifications. For example, it can be used to request from a group of employees the shifts they prefer or are available to work.

The MNS can also be used for internal communications between employees of a company for announcements that require immediate or prompt attention.

FIG. 1 depicts a Mass Notification System (MNS) 100 connected to a plurality of computing devices 110 via a network 115. For this embodiment, the computing devices can be a Personal Computer (PC), laptop, terminal connected to a server, dumb terminal, tablet computer, PDA, Internet Protocol phone, smart phone or any other device capable of displaying information and/or outputting audio. The MNS uses an MNS server 105 which provides the ability to send out notifications in the form of text, image, video, audio, and/or interactive components to a selected group of computing devices 110. As well, these notifications can initiate the execution or launching of specific applications or instructions on the various computing devices which present the notifications to the users. Notifications of one or more levels of priority can be sent by the MNS. In this description, three levels of priority are used as examples: normal notification, emergency notification, and evacuation notification, where the evacuation notification has the highest priority, followed by the emergency notification, with the normal notification having the lowest priority. It should be understood that the network could consist of one or more connected networks (e.g. LAN, CAN, MAN, WAN, VPNs).

The MNS server 105 receives input data from at least one of a plurality of administrator devices 120-1, . . . , 120-$n$ (hereafter, generically these are referred to as the administrator device 120, and collectively, as the administrator devices 120) to which it is connected by the network 115. Once the input data is received from the administrator devices 120, the MNS server 105 determines which selected users are to receive the notification and, thereby, which computing devices are to be contacted. For each computing device to be contacted, suitable notification data is constructed so that the notification can be presented to the user of that computing device. The notification data containing the notification in the chosen format or combination of formats (e.g. text, image, audio, video, and/or interactive components) is then broadcasted to a selected group of computing devices 110-1, 110-2 . . . 110-$n$ (hereafter, generically these are referred to as the computing device 110, and collectively, as the computing devices 110). It should be noted that notification data may include text, image, audio, video, and/or interactive components to be presented to the user being notified. The notification data may also include data to be interpreted as commands or requests by the computing devices 110.

The administrator devices 120 are used by the administrators 125-1, . . . 125-$n$ (hereafter, generically these are referred to as the administrator 125, and collectively, as the administrators 125) to configure and use the MNS. For this embodiment, administrative devices can be a PC, laptop, terminal connected to server, dumb terminal, tablet computer, smart phone, PDA, IP phone, phone, gateway or any other device capable of inputting, displaying and/or playing back information.

It should be noted that the administrator 125 can be a person, a program, or a system that can initiate and manage notifications. For example, if an alarm (physical alarm such as fire alarm, or virtual alarm such as the detection of a server going offline) is raised, a program can act as an administrator and automatically initiate the correct notification.

It should also be noted that notifications received by the computing device 110 from MNS server 105 can originate from any administrator device 120. For example, notifications can originate from a telephone using dial-in capability, a mobile electronic device through a browser, personal computer using a browser or a dedicated program, or another system, appliance or application that is connected to trigger notifications on the MNS server 105 through a gateway.

Figure 2:
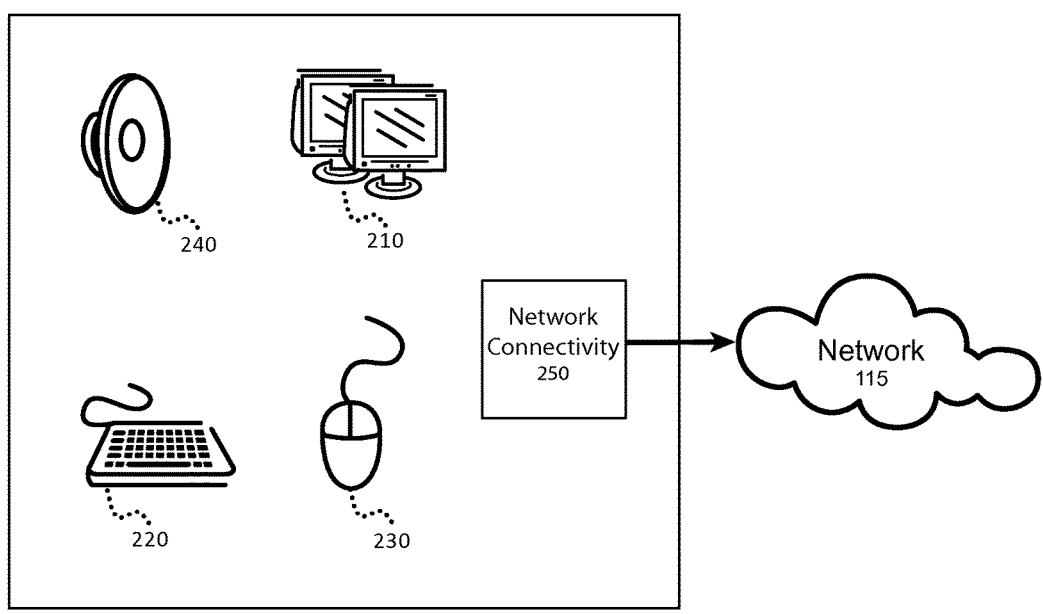
FIG. 2 is a block diagram of components of a computing device of the Mass Notification System (MNS).

Referring to FIG. 2, the computing devices 110 consist of one or more displays 210, an optional keyboard 220, an optional mouse 230, or any other type of user interface devices, such as, for example, a touch screen or an optional speaker 240. Each computing device also has a network connectivity capability 250 (as depicted in FIG. 2) to connect to the network 115.

Figure 3:
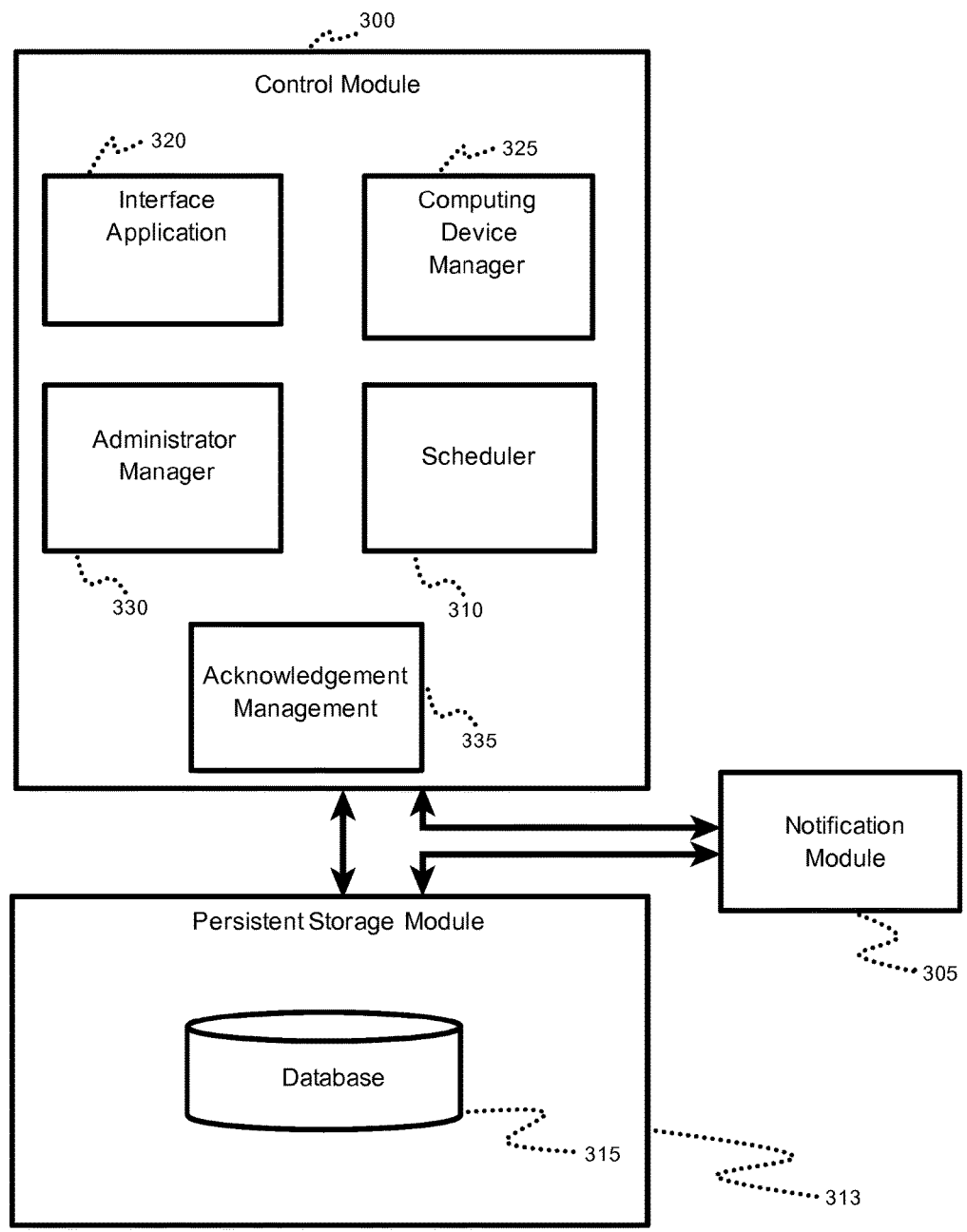
FIG. 3 is a block diagram of applications executable on a Mass Notification System (MNS) of the system.

Referring to FIG. 3, a block diagram of certain applications running on the MNS server 105 is shown. The MNS server 105 includes a control module 300, a notification module 305, and a persistent storage module 313 which may include a database 315. The persistent storage module 313 can control the various hardware storage devices of MNS server 105, such as hard disk drives and the like. The various modules can be implemented as separate physical servers.

Again referring to FIG. 3, the control module 300 performs non-notification related management tasks such as configuring and registering the computing devices 110, and accepting commands from the administrator devices 120. The control module 300 includes an interface application 320, a computing device manager 325, an administrator manager 330, and a scheduler 310. The interface application 320 provides an interface 600 such as a web browser interface and a telephone interface (not shown) to enable the administrator devices 120 to access the MNS server 105 to create, manage and send notifications.

The administrator manager 330 receives input data from the administrator devices 120. The data is input through the interface application 320 that provides the interface by which an administrator accesses the MNS server. Once the input data is received by the administrator manager 330, this data is processed by the scheduler 310 that determines, based on the input data and, if necessary, by referring to the computing devices manager 325, which computing devices are to receive notifications and when these notifications are to be sent.

The computing devices manager 325 manages the non-notification based interactions with the computing devices. As such, the settings and capabilities of each computer device are monitored by the computing devices manager. When determining the type and content of notification data, as well as the notification presentation capabilities for each computing device, the computing devices manager 325 may determine the capabilities of each computing device as registered with the computing devices manager. As will be noted below, each computing device registers with the computing devices manager.

The persistent storage module 313 provides storage for data such as pre-defined notifications that are to be broadcasted, pre-configured instructions on how to broadcast certain notification types and the recipient computing devices of these broadcasts, administrator security information, computing devices and computing device groups, and the status and other meta-data about the computing devices and computing device groups, logs of previously broadcast notifications and the like.

The database 315 can include one or more databases, one or more collections of flat files, or any suitable combination of the above. The database 315 is accessible by the control module 300 either directly or indirectly through the interface application 320, the computing devices manager 325, the administrator manager 330, and the scheduler 310.

The scheduler 310 creates scheduled notifications, either one time or on a recurring schedule. The computing devices manager 325 determines, based on the input data received by the administrator manager 330 which users, and hence which computing devices, are to receive the notifications. The notification module 305 performs text, audio and other notification related tasks such as text-to-speech conversion and the transmission of text, audio, multimedia data and/or other notification data (which may include instructions) to the computing devices 110. The notification module handles notification priorities and any interactions required by the notification. For example, in the case of a building evacuation notification, the notification module can prioritize the transmission of the notifications based on the computing devices geo-location. The notification module 305 creates and processes the notification data. It is also responsible for the transmission of the notification data to the various computing devices. In some variants, the functions of the scheduler and of the notification module may be combined in a single module within the MSN server 105.

The MNS server 105 can also include an acknowledgement management application to monitor and record acknowledgements received from the computing devices. It will now be appreciated that the control module 300 and the notification module 305 can reside together on one server or separately on separate interconnected servers that operate as a single system. Similarly, the MNS server 105 can be a single server or a network of interconnected servers. A single MNS server 105 can be based on a well-known server environment, comprising one or more central processing units (CPU), volatile and non-volatile memory and communication interfaces, housed within an enclosure.

It will be understood that multiple instances of the MNS server 105 can be configured such that some instances of the server act as backups in the case of failure. In an active-standby multiple MNS server 105 setup, the persistent storage module 313 on an active MNS server 105 is mirrored on one or more standby or backup MNS servers 105, providing an additional layer of redundancy. The standby MNS server 105 can be physically remote from the active MNS server 105 to provide redundancy in case of a regional failure affecting one MNS server 105. The standby MNS servers 105 can provide real-time replication of all data from the active MNS server 105 or the standby MNS server 105 can perform periodic incremental backups to ensure that a mirror of the active MNS server 105 exists on the standby servers. A heartbeat process is in place to keep track of both active and standby MNS servers 105. The heartbeat process executes on the active and standby MNS servers 105 and maintains a constant communications link between these servers. The moment the active MNS 105 fails to perform its operations for any reason, the heartbeat process will wake up one of the standby MNS servers. The standby server will come online, be promoted to an active MNS server, establish a connection to all computing device clients registered with the previously active MSN server 105 and handle any subsequent notification.

Additionally, the data in the persistent storage module 313 is preferably backed up on a daily, weekly, and/or monthly rotation, allowing the system 100 to be restored to any saved data copy, safeguarding against data corruption or accidental data deletion.

Figure 4:
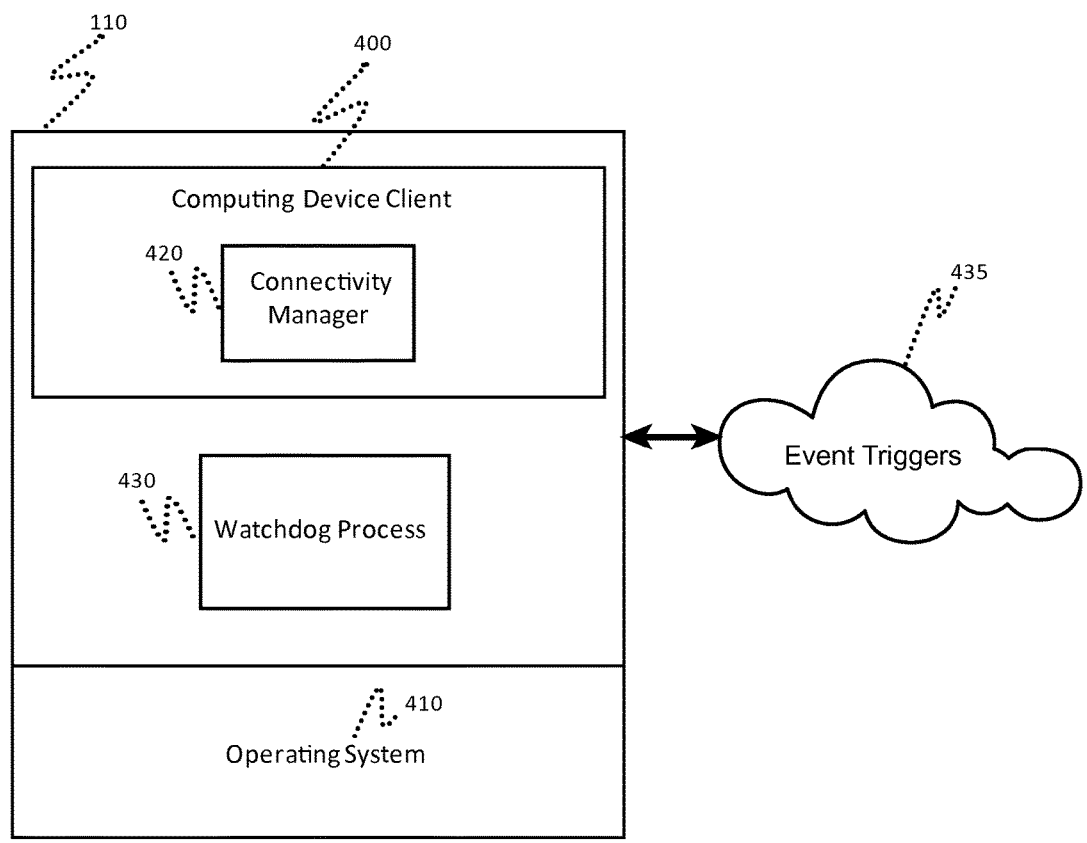
FIG. 4 is a block diagram of applications executable on computing devices of the system.

Referring to FIG. 4, a block diagram of certain applications executable on the computing devices 110 is shown. Each computing device 110 includes a computing device client 400, an operating system 410 and a connectivity manager 420. The computing device client 400 coordinates the activity of the other various components of computing device 110 and detects event triggers (represented schematically at 435). Such event triggers 435 can be requests or commands received from the MNS server 105 to execute specific instructions or to launch specific applications, or confirmation and acknowledgment input from users. As an example, the computing device 110 can receive a request to retrieve its system status from the MNS server 105. Upon receipt of this request, the computing device 110 causes the execution of specific instructions that retrieves its system status and transmits this data to the MNS server 105.

The operating system 410 controls the peripherals of the computing devices 110. Upon receiving commands from the computing device client 400, the operating system 410 executes specific instructions based on the notification data received by the computing device 110. These specific instructions are, for example, displaying text notifications, locking the keyboard 220 and mouse 230, shutting down computing devices 110, placing computing devices 110 into sleep or hibernation mode, and/or displaying images, playing audio, playing back video, handling interactive components, receiving user input (e.g. via text input fields or buttons), opening web pages, or launching programs. As noted above, the text, audio, and/or video being presented to the user may be included in the notification data received by the computing device 110 either as raw data or as links to the data sources. Alternatively, the text, audio, and/or video presented to the user may be predetermined and stored on the computing device 110.

Regarding the connectivity manager 420, upon initial installation on the computing device, it registers with the MNS server 105 to indicate its presence on the network. The connectivity manager 420 manages the transmission of data between the computing devices 110 and the MNS server 105, as discussed below in connection with FIG. 5. The computing device client 400 can determine the status of the computing devices 110 and report the status and unique ID to the MNS server 105, as will be discussed in greater detail below.

Regarding the unique ID for each computing device, this unique ID may be generated by the MNS server 105 and assigned to each computing device as it registers with the MNS server 105. Alternatively, the unique ID may be derived from a unique number or identifier already existing in the computing device. As an example, if applicable, each computing device's Media Access Control (MAC) address may serve as the unique ID. In this case, the MNS server 105 merely has to receive the MAC address for each computing device and use that as the unique ID for each device. As yet another alternative, the unique ID may be generated by the MNS server 105 based on the MAC address (or some equally unique identifier) of each computing device. The unique ID may be the computing device's MAC address concatenated with a further identifier from the MNS server 105. Functionality may be built into the unique ID by having the additional identifier provide embedded information such as an indication of the computing device's location.

The watchdog process 430 is used to ensure that the computing device client is functioning properly and it can log any errors encountered by the computing device client 400 that occur on the computing device 110. The watchdog process 430 can also be configured to transmit a report of any such errors to the MNS server 105 when network connectivity is available. If no connectivity is available, the report remains stored locally at computing devices 110.

The watchdog process 430 also ensures that the computing device client 400 program is present and running on the computing device 110. Whenever the watchdog process 430 determines that the computing device client 400 has been terminated or is not running, it automatically starts or restarts the computing device client 400. The watchdog process 430 is, in turn, monitored by the operating system's services management. If the watchdog process 430 is terminated, it gets restarted by the operating system's services management.

The computing device client 400, connectivity manager 420 and the watchdog process 430 are installed on the computing devices 110 that could be selected to receive a notification. The computing device client 400 cannot be removed or disabled without the approval of a system administrator. The computing device 110 can be configured such that only administrators of the network 115 or of the computing device 110 have privileges to remove any of the computing device client 400, or the watchdog process 430.

Figure 5:
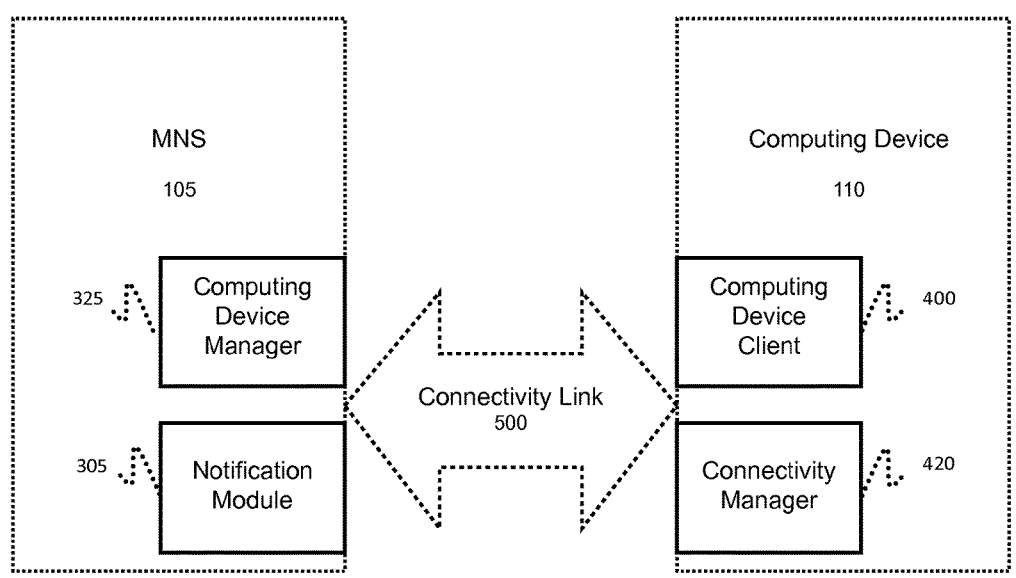
FIG. 5 is a block diagram of network connections between the computing devices and the MNS of FIG. 3.

FIG. 5 depicts the network links established by the notification module 305 of the MNS server 105 to the computing device client 400 of each computing device 110. The connectivity can be permanent, it can be established periodically, or it can be established each time a notification is sent. The connectivity link 500 provides a connection between the MNS server 105 and the computing device 110. The nature of the connectivity link can be different depending on the type of computing device. As an example, if the computing device is IP-based, then an IP-based connection can be established between the MNS and the computing device. Depending on the configuration of the computing device 110, the connectivity link 500 may transport the text, image, video, audio, interactive components, and operating system instructions for each notification to the computing device client 400. When notification data is received from the MNS server 105, the connectivity manager 420 passes the message to the computing device client 400 to execute instructions that would present the notification to the user. The computing device clients 400 (perhaps through the operating system 410) gains control of screensavers, login windows, keyboards 220, mouse 230, speakers 240 and other programs as defined by the contents of the notification data. The connectivity link 500 also allows the computing device client 400 to send back notification acknowledgement receipts, and to report back errors that cause any notifications or notification related instructions not to be successfully presented or executed.

If a computing device 110 gets started for the first time or restarted in the middle of executing instructions for an active notification, the computing device client 400 checks with the MNS server 105 and executes any further instructions for any notification that is currently active.

FIG. 6 depicts an exemplary view of the interface used by the administrator 125 to enable the administrator devices 120 to access the MNS server 105. An example view of the notification window 600 contains user input fields for the administrator to define the contents and conditions of the message such as, but not limited to, the following: title 610, notification message 615, image 620, video, audio, interactive components, acknowledgement requirement 625, display time 627, level of priority 630, scheduler 640, and a means for selecting the computing devices (individual, by group, by location, by smart filter) that should receive the notification 650. This interface may also be used to create polling questions, multiple possible responses to the polling questions, or yes/no type questions. The notification can also be created through a voice interface using an audio only device, for example, a telephone. The notification would then be sent out as an audio notification or be converted to text using a speech-to-text application and sent out as a text and audio notification. The voice-only capable device can also launch a previously configured notification.

Figure 7:
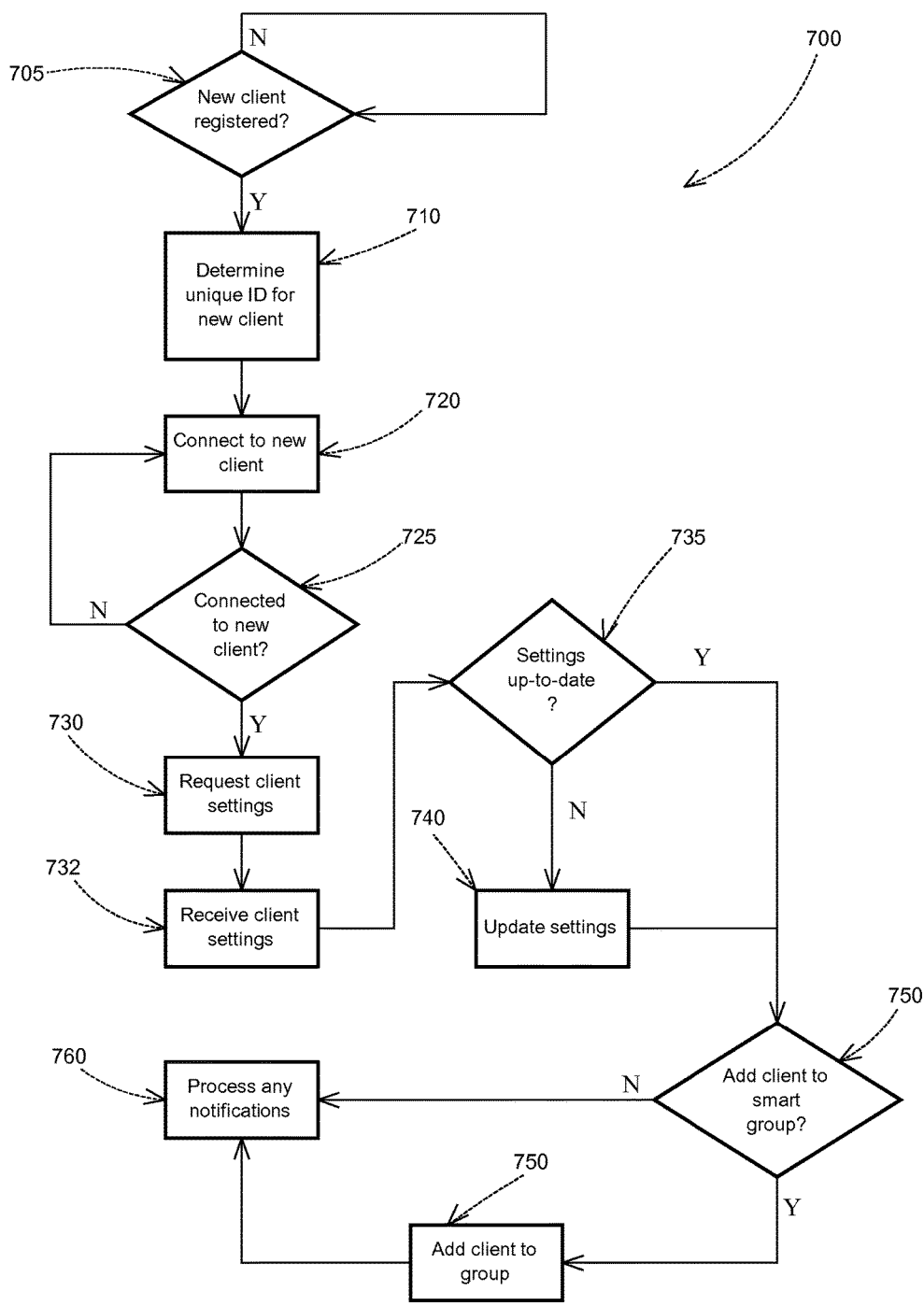
FIG. 7 is an exemplary flow chart of the client connection management function.

FIG. 7 depicts a flowchart detailing the steps in a client connection management function 700 which is invoked by the computing device manager 325 on the MNS server 105 when a computing device client 400 registers with the MNS server 105 after installation or restart. Alternatively, the MNS server 105 periodically detects any new computing device client 400 that has been installed on the network and initiates the registration.

The process in FIG. 7 starts with decision 705 that determines whether a new computing device client added to the network has been detected or whether a new computing device client is registering with the MNS server 105. In step 710, the unique ID of the new computing device client is determined by the MNS server 105. The unique ID could also be determined by the client. With the unique ID determined, the MNS server 105 then connects to the new computing device client (step 720). Alternatively, the computing device client may be the one to establish the connection. The connection may be made using the currently known IP address of the new computing device client if the MNS server 105 initiates the connections, or the currently known IP address of the MNS server 105 if the client initiates. Decision 725 then determines if the connection has been made. If not, an attempt to establish the connection is again made. If the connection is established, then the MNS server 105 requests or is offered the settings of the new computing device on which the new computing device client is installed (step 730). If the requests have been made, the MNS server 105 then receives the new client settings (step 732) and decision 735 then determines if these received settings are compatible with the settings expected by the MNS server 105. If these settings are not compatible, then the settings are updated (step 740), or potentially, the client can be rejected and the connection closed. Other data relating to the computing device, such as the type of computing device, the computing capability (e.g. version of operating system, type of hardware) and the available software (e.g. virus detection), can also be queried, updated and stored for the computing device client during this segment of the process. It should be noted that updating the settings on the computing device may involve determining that the software is up to date (i.e. is of the latest version), that the computing device's system parameters are up to date and/or that the system parameters on the computing device are properly configured. Once the settings have been updated or if the settings were determined to be up-to-date in decision 735, decision 750 determined if the new client has to be added to one or more smart groups. If the new computing device is to be added to at least one smart group, then in step 750 it is added to the relevant group(s) and the process proceeds to step 760. The smart groups can be defined by criteria such as, IP address, MAC address, hostname, geolocation, or other definable characteristics or capabilities. Determining the members of a smart group is accomplished by filtering the computing devices based on at least one smart group criterion. If the computing device does not need to be added to a smart group, then step 760 is that of processing or continuing to process any pending notifications on the computing device.

The computing device manager 325 is able to connect, any time as needed, with each and every individual computing device client 400 via the connectivity link 500. In a variant, the computing device manager 325 maintains a live link with each and every individual computing device client 400 via the connectivity link 500. The live link ensures that minimal set up time is required for notification data to be transmitted from the MNS server 105 to the computing device. The live link may be kept alive or active by periodic signals between the MNS server and the computing devices.

Figure 8:
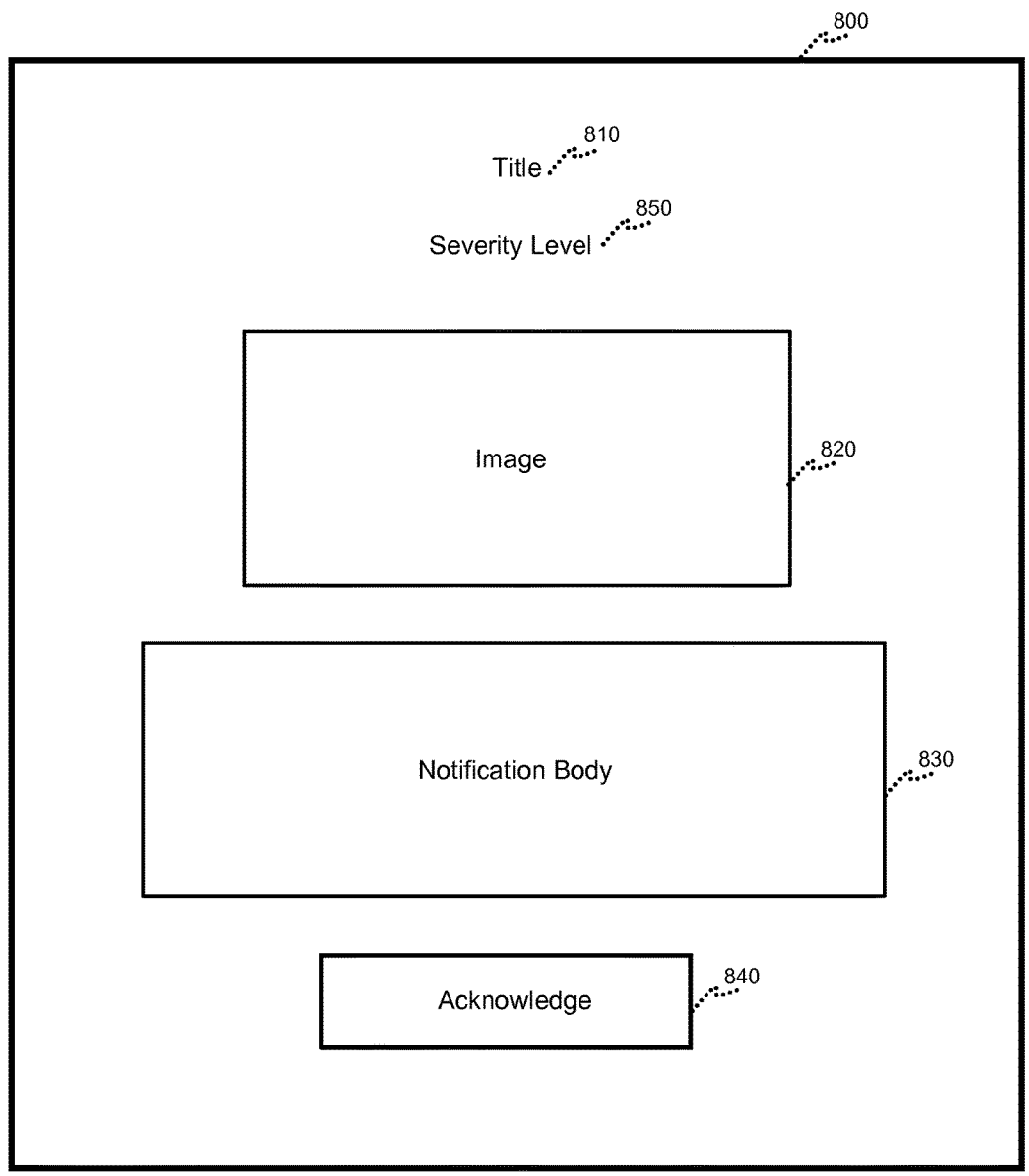
FIG. 8 is an exemplary notification (regular) window provided by the MNS.

FIG. 8 depicts an example of a notification window 800 which displays fields such as, but not limited to, a title 810, a priority level indication 850, an image 820, a video, audio, body text 830, and an acknowledgement button 840 (if required) and other interactive components. The notification window 800 can be configured to use various font sizes, font colors, notification window sizes and notification window color schemes for different types of notifications or notification priority. As an example, the border of the notification window 800 could be colored red for a notification of emergency priority. If the MNS server 105 maintains information about the type and capability of each computing devices 110, the notification window can be adapted based on the size of screen and computing capability of the computing device 110. The adaptation can be done either by the computing device client or it can be done by the MNS server 105 which would modify the notification to the type and capability of the receiving computing device before sending it.

It should be noted that multiple variations regarding the above are possible. In one variant, the MNS server 105 sends all the data required to present a notification to the computing device as notification data. The screen parameters, the window showing the visual indicia, the text, as well as any audio files to be played are all created by the MNS server 105 and are transmitted to the computing device as notification data. As an example, the MNS server 105 can send to the computing device a graphic file depicting the notification to be presented to the user as well as any audio files that are to be played during the notification presentation. The computing device merely presents the notification graphic to the user and plays any associated audio file while the notification graphic is viewable. In another variant, only the text to be displayed on the notification window, as well as any commands required, is sent by the MNS server 105. The computing device may have generic templates to be used when presenting notifications to the user. The font and size of the text received from the MNS server 105 can be adjusted by the computing device to fit and/or suit the templates being used. As an example, for emergency notifications, the computing device may have preconfigured and predetermined window configuration with a flashing red border and a large "EMERGENCY" graphic in the middle of the window. The text in the notification data can then be inserted in the middle of the window to provide more details regarding the emergency. While the emergency window is being displayed, an audio file of a loud siren sound may be played. The audio file may be resident on the computing device and may be part of the emergency notification template used for emergency notifications.

Acknowledgement Notification Example

Figure 9:
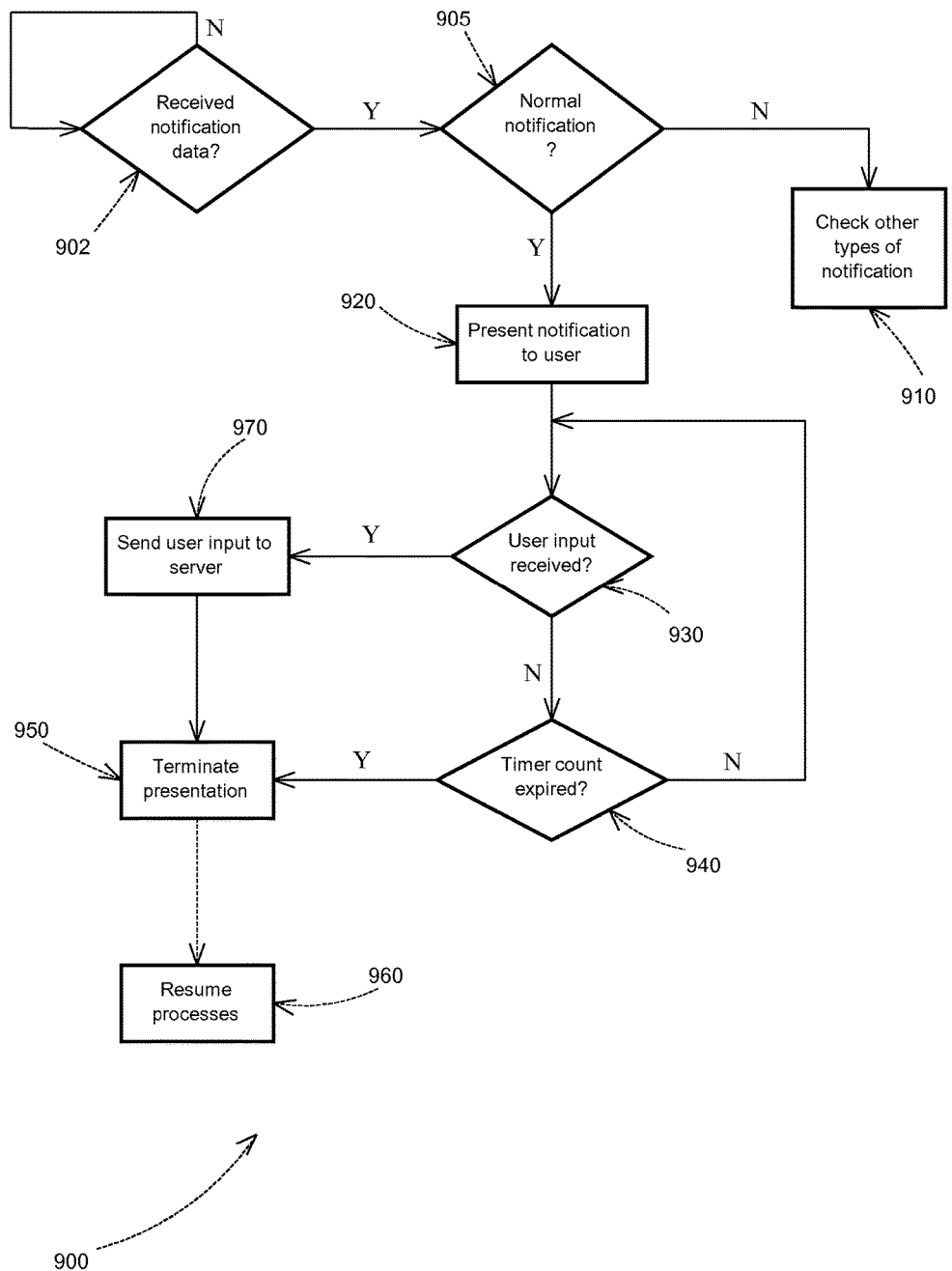
FIG. 9 is an exemplary flow chart of the processing of a notification requiring acknowledgement.

FIG. 9 illustrates an exemplary notification process flow chart 900 which depicts the process executed by the computing device client 400 upon receipt of notification data that requires an acknowledgement. The process begins at step 902 when the computing device 110 receives notification data from the MNS server 105. Decision 905 then determines if the data in the notification is that for a normal notification priority or if a higher notification priority is indicated. If a higher priority notification is indicated, step 910 then determines the priority level indicated and a different process is then executed. If the notification data indicates a normal priority, then indicia related to the notification is presented to the user (step 920). This step may involve displaying a notification screen with suitable text, playing an audio file, displaying a suitable icon on the screen, or showing any suitable visual indicia on the screen. As part of the notification presentation, an acknowledgement and/or user feedback block is shown to the user. This block may be part of the notification screen (as illustrated in FIG. 8) or it may be separate from the notification screen. With the notification being presented to the user, decision 930 determines if user feedback/user acknowledgement has been received. If no acknowledgement or user feedback has been received, decision 940 checks if a timer or similar software mechanism has expired. The length of time the timer is active depends on a predetermined duration that the computing device will wait for user input/acknowledgement. If the timer has not yet expired, then, as can be seen from the flowchart, a logic loop continuously checks for both the timer and the user input. Alternatively, a timer can be started and, once the timer has expired, a software function call or an interrupt can be generated to notify the system that the timer has expired. If the timer has expired, then the notification presentation is terminated (step 950) and the computing device resumes whatever processes had been suspended or restores windows which were hidden just prior to the notification presentation (step 960). On the other hand, if an acknowledgement or user input has been received, then that user input or acknowledgement is transmitted to the MNS server 105 (step 970). The notification presentation is terminated (step 950). The computing device then resumes whatever processes had been suspended or restores hidden windows (step 960).

It should be noted that, in the event a screensaver or a login screen/prompt is active on the computing device when a notification is received, the computing device suspends or attempts to suspend the screensaver and displays visual indicia related to the notification (such as a notification screen) on top of the login screen. The size of the notification screen may be configurable by the source of the notification (e.g. an administrator device, a user of the administrator device).

Locking Notification Example

Figure 10:
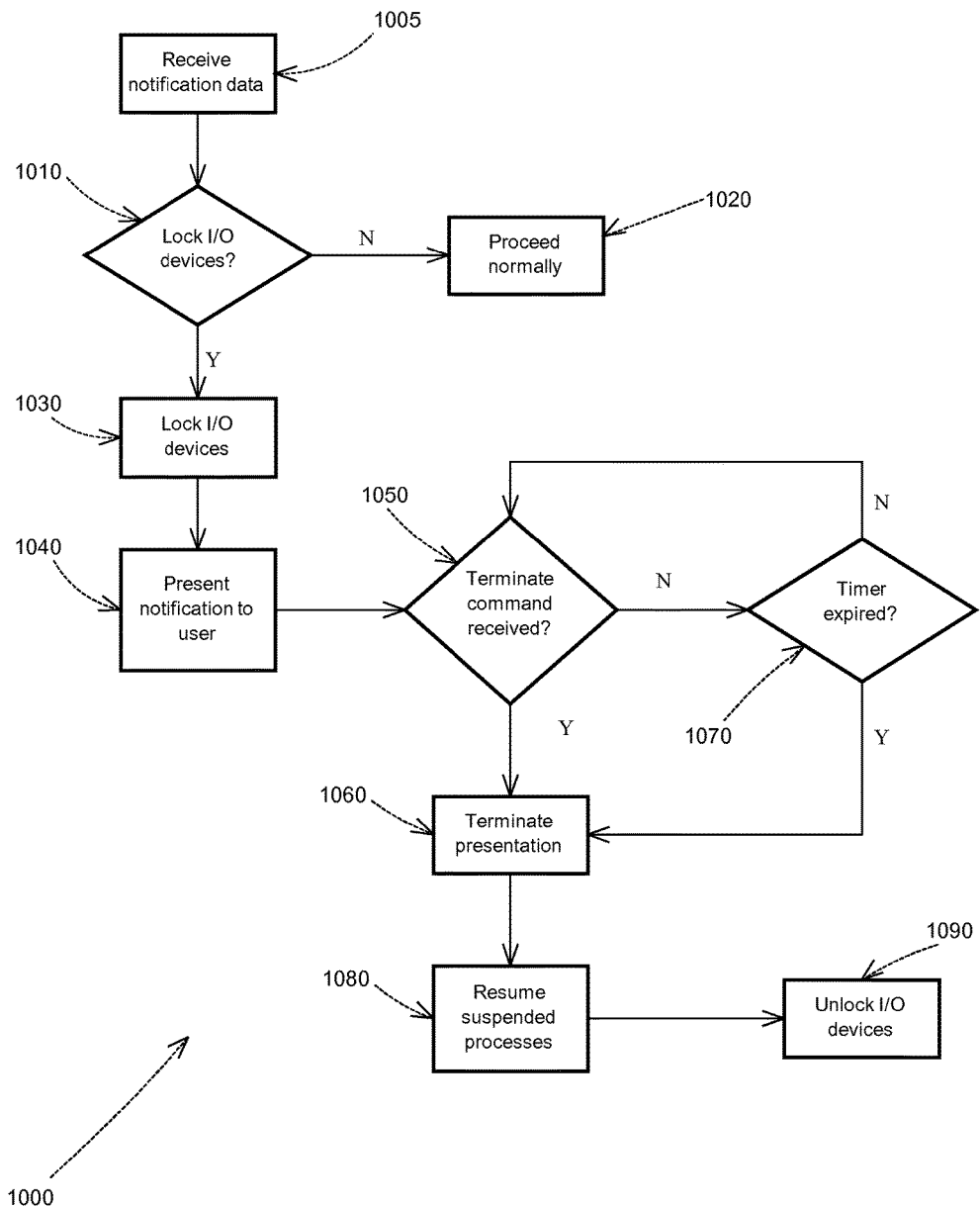
FIG. 10 is an exemplary flow chart of a notification locking the input devices.

FIG. 10 depicts a notification process flow chart 1000 showing an example of the receipt of notification data that requires locking the mouse and keyboard of the recipient computing device to ensure the notification is not easily ignored or dismissed. The notification could be of any level of priority. The locking notification can be combined with the acknowledgement notification described above where the user acknowledges a notification before the locking actions take place.

The process in FIG. 10 begins with the receipt of notification data by the computing device (step 1005) from the MNS server 105. The computing device determines 1010 whether locking the user input interface devices (such as the keyboard and mouse) is required after inspecting the contents of the notification data. If no locking of the user input interface devices is required, then the notification presentation proceeds normally (step 1020) per the steps in FIG. 9. On the other hand, if the user input interface devices are to be locked, then step 1030 is that of locking the keyboard and/or mouse of the computing device. With the user input interface devices locked, the notification is then presented to the user (step 1040). As noted above, the notification presentation can take the form of a full screen window displaying text and/or graphics relating to the notification as well as playing any audio file related to the notification or the launching of other applications. With the user now unable to affect the notification presentation due to the locking step 1030, the presentation can only be terminated either by a timer (either on the computing device client 400 or on the MNS server 105) reaching a predetermined duration or by a command from an administrator by the MNS server 105. Decision 1050 thus determines if a cancellation command has been received from the MNS server 105. If such an order has been received, then the notification presentation is terminated (step 1060). If such a command has not been received, then the decision 1070 determines if the timer has run out. If the timer has not run out, then the loop returns to decision 1050. Alternatively, if the timer has run out, then the logic loops to step 1060, that of terminating the notification presentation. The processes suspended or the windows hidden by the receipt of the notification data are then resumed (step 1080) and the user interface devices are unlocked (step 1090).

It should be noted that while the example given above does not provide for an acknowledgement of the notification by the user, such a variant is also possible. In such a variant, the user is given an acknowledgement screen/button, as detailed above and as illustrated in FIG. 8, prior to a locking of the user input devices. Once the user has acknowledged the notification, the user input devices are then locked. Of course, for this variant, a timer that determines when to terminate the notification may be started only after the acknowledgement has been received by the computing device from the user. Such a variant allows the MSN server 105 to track which users have seen the notification.

Shutdown Notification Example

Figure 11:
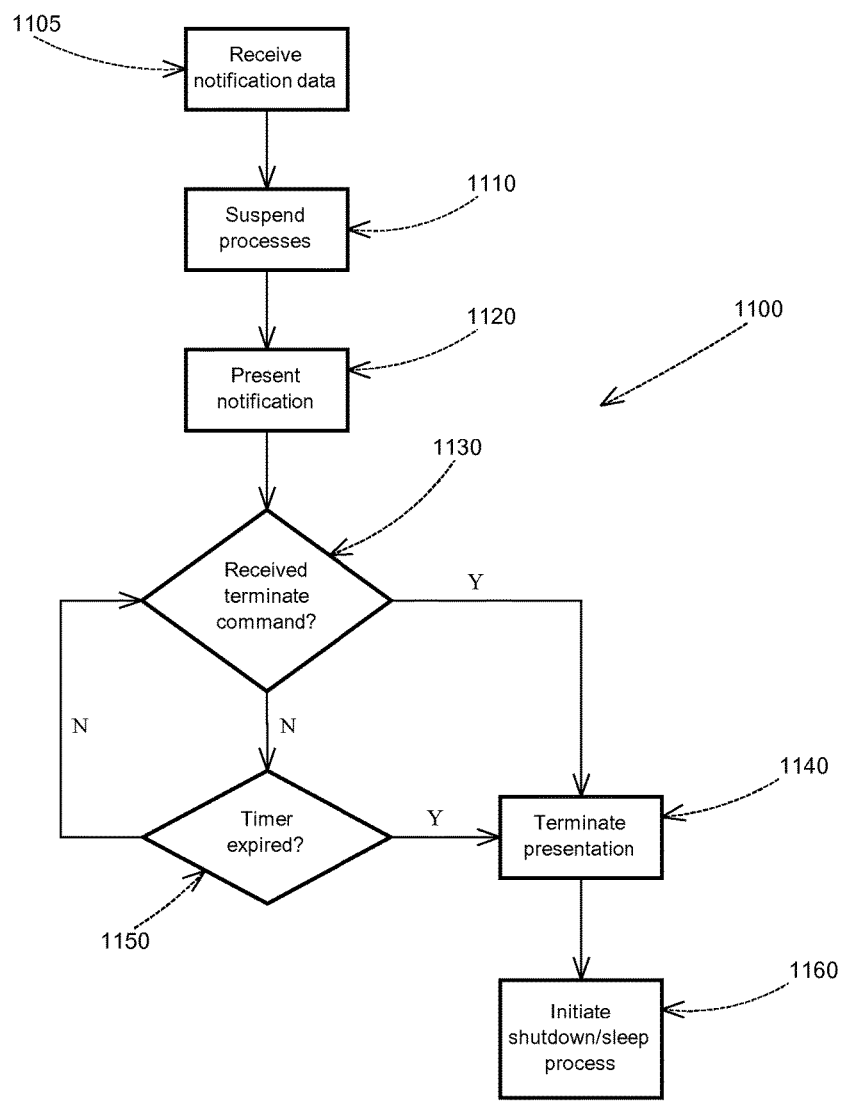
FIG. 11 is an exemplary flow chart of a notification followed by the shutdown of the computing device.

FIG. 11 depicts a shutdown notification process flow chart 1100 showing an example of an evacuation notification that triggers a shutdown of the computing device. This notification can be used for any priority level. For example, it could be used to shutdown all the computing devices in a room at the end of each day, or it can be used for shutting down all computing devices in a building during an evacuation.

The process in FIG. 11 begins with the receipt of notification data by the computing device from the MNS server 105. In this example, the notification data includes an indication that an emergency evacuation notification is to be presented to the user. After processing the notification data, the computing device suspends whatever processes are running (step 1110) on the device or hides the windows of these processes. The user interface devices attached to the computing device may also be locked at this point to ensure that the user's attention is directed at the notification. The notification is then presented to the user (step 1120). As noted above, this notification presentation may take the form of a full screen window displaying any text, icons, or graphics that are associated with the notification. An audio file may also be played in conjunction with the full screen window to further ensure that the user notices the notification. In this example, since the notification relates to an emergency evacuation, graphics and sounds that are easily noticed and which are hard to ignore are preferably used in the notification presentation. With the notification now presented to the user, the computing device then checks if a cancel/terminate command from the MNS server has been received (decision 1130). This may be necessary especially if the user interface devices have been locked. If such a terminate command has been received, then the computing device terminates the presentation (step 1140). If the terminate command has not been received, then the computing device checks if the countdown of a timer or another suitable mechanism has expired. As with the previous example, this timer is used to ensure that the notification has been presented to the user for a suitable amount of time and to ensure that the notification presentation is self-terminating. If the count in the timer has not yet expired, then the loop returns to decision 1130. If the count has terminated, then the presentation is terminated (step 1140). A shutdown process for the computing device is then initiated (step 1160). Alternatively, instead of a shutdown process, a sleep or hibernation mode can be engaged for the computing device. In the event the user interface devices were previously locked, these devices can be unlocked after the presentation was terminated in step 1104.

It should be noted that while the example given above does not provide for an acknowledgement of the notification by the user, such a variant is also possible. In such a variant, the user is given an acknowledgement screen/button, as detailed above and as illustrated in FIG. 8, prior to an initiation of the shutdown process. Once the user has acknowledged the notification, a shutdown process is started. Of course, for this variant, the acknowledgement is transmitted to the MNS server 105 prior to shutting down the computing device. Such a variant allows the MSN server 105 to track which users have seen the notification.

Handling Multiple Notifications

If several notifications are sent before they are terminated or acknowledged, the priority level of the notification dictates how the computing device client 400 handles them. Notifications with a higher priority always pre-empt notifications with a lower priority.

As a first example, the computing device client 400 may receive a normal notification followed by an emergency notification while the normal notification is active. The normal notification process 900 is terminated and the emergency notification process 1000 is engaged, as discussed above. Once the emergency notification is terminated, the normal notification can, optionally, be re-engaged.

As a second example, the computing device client 400 may receive a normal notification 905 followed by a second normal notification 905 while the first normal notification is active. The second normal notification process 900 becomes active as discussed above only after the first normal notification 905 is acknowledged, remotely terminated, or automatically terminates due to the expiry of a timer count.

As a third example, the computing device client 400 may receive an emergency notification 1005 followed by a second emergency notification 1005. In this case, the first emergency notification process 1000 is terminated and the second emergency notification process 1000 is engaged immediately as discussed above.

It should be noted that, to ensure that emergency notifications are properly dealt with, notifications with a higher priority will always preempt notifications with a lower priority. However, if multiple notifications with the same priority level are received in quick succession, the last received notification will preempt earlier notifications and may be immediately presented unless, of course, they are all normal notifications. If they are all normal notifications, then they will be dealt with as noted above. In one variant, the notification data may be time or date-stamped or coded so that the computing device can quickly determine which notification data came in last. This implementation would allow multiple notifications with the same priority level to be sent so that users can be updated on a developing situation. As an example, if a suspicious individual enters a secure facility, the first emergency notification would inform users of the presence of the individual and instruct them to stay inside their offices. The next notification may update users as to whether the police have been informed and whether it is safe to leave their offices.

In a fourth example, the computing device client 400 receives an emergency notification 1005 and this is followed by a normal notification 905. In this case, the normal notification process 900 is engaged as discussed above after the emergency notification process 1000 is terminated.

As a fifth example, the computing device client 400 receives an evacuation notification 1105. In this case any active notification is terminated and any other pending notifications are cancelled. The evacuation notification process 1100 is engaged as discussed above.

In one variant, the MNS server 105 may also send notifications to users who may be using a different communications network such as, for example, a cellular telephone network. For this variant, the MNS server 105 may send the notification as a text message to a user's mobile phone. The input data from the administrator (whether as voice data or text data) is transformed into text which can be sent as a text message using the SMS (Short Message System) service to the user's mobile phone. Alternatively, the notification can be sent as a message with multimedia content to a user's mobile telephone device using the MMS (Multimedia Messaging Service) system. The notification can also be sent as an email message to email addresses. The notification may also be sent as an automated audio message to telephone devices or it may be sent as an audio message to paging devices.

It should be noted that polling questions may also be sent to users on the different communications network by converting the text of the polling question into audio. The audio polling question can then be delivered as an automated telephone call to a user on his or her telephone handset. The response options available to the user responding to the polling question may also be presented as audio with the user indicating his or her choice by inputting specific telephone digits.

It will now be apparent that the steps of the above methods can be varied and likewise that various specific design choices can be made relative to how to implement various steps in the methods.

The embodiments of the invention may be executed by a computer processor or similar device programmed in the manner of method steps, or may be executed by an electronic system which is provided with means for executing these steps. Similarly, an electronic memory means such computer diskettes, CD-ROMs, Random Access Memory (RAM), Read Only Memory (ROM), fixed disks or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g. "C"), an object-oriented language (e.g. "C++"), a functional language (e.g. LISP), or a combination of different languages. Alternative embodiments of the invention may be implemented as pre-programmed hardware elements, other related components, or as a combination of hardware and software components. Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A portion of the disclosure of this document contains material which is subject to copyright protection. The copyright owner has no objection to the facsimile reproduction by any one the patent document or patent disclosure, as it appears in the Patent and Trademark Office patent file or records, but otherwise reserves all copyrights whatsoever. Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

We claim:

1. A computer server for sending notifications to computing devices associated with a plurality of users, the server coupled to said computing devices over at least one network, the server comprising:
    a computing device manager to determine upon connection and to monitor settings and capabilities of the computing devices;
    an administrator manager for receiving input data relating to said notifications, said notifications comprising a plurality of priority levels;
    a scheduler for determining which computing devices are to receive the notifications and for processing said input data to select users from said plurality of users to receive said notifications, and to create notification data to be sent to at least one computing device used by at least one selected user; and
    a notification module for prioritizing based on the priority levels and for sending said created notification data to the at least one computing device used by the at least one selected user, said notification data to be used by said at least one computing device to:
        execute, based on said notification data, instructions for presenting indicia to said at least one selected user, wherein said presenting indicia further comprises presenting an acknowledgement block to the at least one selected user to send an acknowledgement of said notification data,
        further wherein if said at least one selected user does not send said acknowledgement before expiry of a timer, said presenting of indicia is terminated,
        wherein the server generates a unique identification for said computing devices, and
        wherein the server receives from the at least one computing device, a report comprising a computing device status and the unique identification.

2. A server according to claim 1, wherein said input data is received from at least one administrative device.

3. A server according to claim 1, further comprising using the computing device manager to determine which computing devices are to receive the notifications based on the input data.

4. A server according to claim 1, further comprising an interface module for presenting a user interface for use by a user of at least one administrative device.

5. A server according to claim 1, wherein each unique identifier is based on a computing device unique identification and a further identifier.

6. A server according to claim 1, wherein said computing devices are logically grouped by said server based on the locations of said computing devices.

7. A server according to claim 1, wherein said server is an active server, further comprising:
    the active server communicating with one or more standby servers to act as backup to the active server; and
    a heartbeat process to:
        keep track of said active server and said one or more standby servers,
        maintain said communications between said active server and said one or more standby servers, and
        promote one of the one or more standby servers to become the active server if the active server fails to perform its operations.

8. A server according to claim 1, wherein, based on contents of said notification data, said at least one computing device executes instructions for launching at least one separate application.

9. A server according to claim 1, wherein said prioritizing is further based on one or more geo-locations associated with the at least one computing device.

10. A server according to claim 1, further wherein, upon executing said instructions, a notification window is displayed on at least one screen associated with the at least one computing device,
    said notification window adapted based on at least one of:
        size of said at least one screen,
        type of said at least one computing device, and
        computing capability of said at least one computing device.

11. A method for sending notifications, by a server, to computing devices associated with a plurality of users, the server coupled to said computing devices over at least one network, the method comprising:
    determining upon connection to the server and monitoring, by a computer device manager, settings and capabilities of the computing devices;
    receiving, by an administrator manager module, input data relating to said notifications, said notifications comprising a plurality of priority levels;
    processing, by a scheduler, said input data, wherein said processing comprises:
        selecting users from said plurality of users to receive said notifications, and
        creating notification data to be sent to at least one computing device used by at least one selected user; and
    sending and prioritizing based on the priority levels, by a notification module, said created notification data to the at least one computing device used by the at least one selected user, said notification data to be used by said at least one computing device for:
        executing, based on said notification data, instructions for presenting indicia to said at least one selected user, wherein said presenting indicia further comprises presenting an acknowledgement block to the at least one selected user to send an acknowledgement of said notification data, further wherein, if said at least one selected user does not send said acknowledgement before expiry of a timer, said presenting of indicia is terminated, wherein the server generates a unique identification for said computing devices, and wherein the server receives from the at least one computing device, a report comprising a computing device status and the unique identification.

12. A method according to claim 11, wherein said input data is received from at least one administrator.

13. A method according to claim 11, further comprising:
registering, by said server, said computer devices,
managing, by said server, said computing devices.

14. A method according to claim 11, further comprising presenting, by said server, a user interface to at least one administrative device.

15. A method according to claim 11, wherein each unique identifier is based on a computing device unique identification and a further identifier.

16. A method according to claim 11, further comprising grouping, by said server, said computing devices based on the locations of said computing devices.

17. A method according to claim 11, wherein said server is an active server, further comprising:
the active server communicating with one or more standby servers to act as backup to the active server;
keeping track of said active server and said one or more standby servers;
maintaining said communications between said active server and said one or more standby servers;
promoting one of the one or more standby servers to become the active server if the active server fails to perform its operations.

18. A method according to claim 11, wherein, based on contents of said notification data, said at least one computing device executes instructions for launching at least one separate application.

19. A method according to claim 11, further comprising prioritizing, by said notification module, the sending of notification data to the at least one computing device used by the at least one selected user, said prioritizing further based on one or more geo-locations associated with the at least one computing device.

20. A computing device client running on a computing device connected to a server over a network, wherein said client:
registers with said server, wherein the server generates a unique identification for the computing device;
receives from the server a request for settings of the computing device and the unique identification;
determines contents of notification data, comprising a plurality of priority levels, received from said server;
receives, based on the priority levels, by a notification module, said notification data;
performs a watchdog process to ensure that the computing device client is functioning properly and log any errors encountered by the computing device client that occur on the computing device; and
executes instructions, based on said contents, for presenting indicia to a user of said computing device,
wherein said presenting indicia further comprises presenting an acknowledgement block to the user to send an acknowledgement of said notification data, further wherein if said user does not send said acknowledgement before expiry of a timer, said presenting of indicia is terminated, and
wherein the computing device reports a computing device status and the unique identification to the server.

* * * * *